(12) United States Patent
Delnick et al.

(10) Patent No.: US 7,947,397 B1
(45) Date of Patent: May 24, 2011

(54) BATTERY COMPONENTS EMPLOYING A SILICATE BINDER

(75) Inventors: Frank M. Delnick, Albuquerque, NM (US); Frederick W. Reinhardt, Albuquerque, NM (US); Judy G. Odinek, Rio Rancho, NM (US)

(73) Assignee: Sandia Corporation, Albuquerque, NM (US)

( * ) Notice: Subject to any disclaimer, the term of this patent is extended or adjusted under 35 U.S.C. 154(b) by 730 days.

(21) Appl. No.: 11/621,826

(22) Filed: Jan. 10, 2007

(51) Int. Cl.
*H01M 2/16* (2006.01)
*H01M 4/62* (2006.01)
(52) U.S. Cl. ........................... 429/232; 429/252
(58) Field of Classification Search .............. 429/221, 429/232, 247, 252
See application file for complete search history.

(56) References Cited

U.S. PATENT DOCUMENTS

| | | | | |
|---|---|---|---|---|
| 3,427,203 A | * | 2/1969 | Fletcher | 429/232 X |
| 4,654,281 A | * | 3/1987 | Anderman et al. | 429/232 X |
| 5,705,291 A | | 1/1998 | Amatucci et al. | |
| 6,348,259 B1 | * | 2/2002 | Hilarius et al. | 429/232 X |
| 6,524,750 B1 | * | 2/2003 | Mansuetto | 429/232 |
| 6,653,016 B2 | * | 11/2003 | Maske et al. | 429/232 X |
| 6,703,163 B2 | * | 3/2004 | Ogura et al. | 429/232 X |
| 6,790,555 B2 | * | 9/2004 | Kolb et al. | 429/59 |
| 7,005,211 B2 | * | 2/2006 | Kim et al. | 429/217 |
| 7,105,251 B2 | * | 9/2006 | Miyaki et al. | 429/232 X |
| 2003/0162100 A1 | * | 8/2003 | Takahashi et al. | 429/333 |

* cited by examiner

*Primary Examiner* — Stephen J. Kalafut
(74) *Attorney, Agent, or Firm* — Carol I Ashby (57) ABSTRACT

A battery component structure employing inorganic-silicate binders. In some embodiments, casting or coating of components may be performed using aqueous slurries of silicates and electrode materials or separator materials.

7 Claims, 7 Drawing Sheets

BATTERY COMPONENTS EMPLOYING A SILICATE BINDER

The United States Government has rights in this invention pursuant to Department of Energy Contract No. DE-AC04-94AL85000 with Sandia Corporation.

BACKGROUND OF THE INVENTION

This invention relates to the fabrication of electrode and separator components for batteries.

Thermal batteries are a type of battery characterized by long shelf-life (>20 years) even under extreme environmental conditions. They exhibit high functional reliability even after prolonged storage and possess high power capability. A typical thermal battery comprises an alkali alloy, such as a lithium alloy, or alkaline earth metal anode, a salt electrolyte, a metal salt, such as a metal chromate or metal sulfide cathode, and a heat source that is usually positioned between the cells. Cells are stacked in bipolar configuration and thermal insulation is positioned around the circumference and at both ends of the cell stack. The battery case is hermetically sealed. An energy impulse from some external source activates the heat source (often pyrotechnic materials) to melt the electrolyte. The battery then becomes ionically conductive and produces high power for a short period of time, typically from a few seconds to an hour or so. A typical thermal battery operates over the temperature range of approximately 352 to 600° C.

The most common anode material is a lithium alloy such as Li(Si) or Li(Al), although calcium is also sometimes used. The electrolyte is typically a molten eutectic mix of lithium chloride and potassium chloride which has a melting point of 352° C. Some materials that can be used for cathodes in various batteries designed to operate at elevated temperature or at ambient temperature include calcium chromate, potassium chromate, potassium dichromate, lead chromate, metal oxides, metal sulfides, metal phosphates, metal oxyphosphates, poly-carbon monofluoride, carbon, carbon black, and graphite. The Li(Si)/$FeS_2$ cell configuration has the advantages of operation under discharge conditions from open circuit to high current densities, tolerance to processing variation, and stability in extreme environments. Disadvantages of current designs of thermal batteries include low energy density, activated surface temperature of 230° C. or higher, and high cost.

The basic design and production methodology of thermal batteries was developed in the mid-1960s, and since then, there have been some changes in the anode, separator and cathode materials. However, the basic design and fabrication processes remain the same, and the use of these processes yield batteries that are often drastically overbuilt yet not robust.

A conventional thermal battery consists of a stainless steel can which contains a bipolar stack of cells consisting of discrete elements, including the cathode pellets, anode pellets, electrolyte pellets, heat pellets, stainless-steel current collectors, grafoil current collectors; and thermal insulation. The pellet geometry (surface area and thickness) is dictated by the pressing processes used to fabricate the pellets. A minimum pellet thickness is required to achieve mechanical integrity, and this thickness is typically far greater than that required to meet the electrical requirements of the battery. Currently available thermal batteries often contain 5-fold to 40-fold excess of active ingredients, and therefore they operate at a Coulombic efficiency of only 2.5 to 20%. Additionally, the excess material in the pellet, which facilitates the mechanical integrity of the pellet, also increases the pellet resistance, and thereby reduces the output power. In addition to the problems of power loss and low Coulombic efficiency, the excess mass of pellet-based components must be heated and maintained at temperature, so additional weight and volume penalties result from the need for excess heat powder, excess insulation, and a larger/heavier stainless steel container. Thus, advances in thermal battery performance have been limited by continued use of the pellet processing technology originally developed in the 1960s. Very significant improvements in energy density and power density could be made by eliminating the excess active materials in the battery components by making them thinner. A change from powder processing and pellet pressing to materials and processes that can produce thinner components can realize major improvements in battery performance.

BRIEF DESCRIPTION OF THE DRAWINGS

The accompanying drawings, which are incorporated in and form part of the specification, illustrate some embodiments of the present invention and, together with the description, serve to explain the principles of the invention.

FIG. 1 illustrates some embodiments of this invention showing: 1a) a battery cell with an electrode comprising an electrode material and a silicate binder; 1b) a battery cell with one electrode comprising an electrode material and a silicate binder and a separator comprising a silicate binder.

DETAILED DESCRIPTION OF THE INVENTION

This invention comprises batteries with components made using glassy silicates as inorganic binders and the method for fabricating the battery components with glassy silicate binders. Significant improvements in energy density and power density can be made by eliminating excess active materials in battery components by making them thinner using the method of this invention.

Figure 1A:
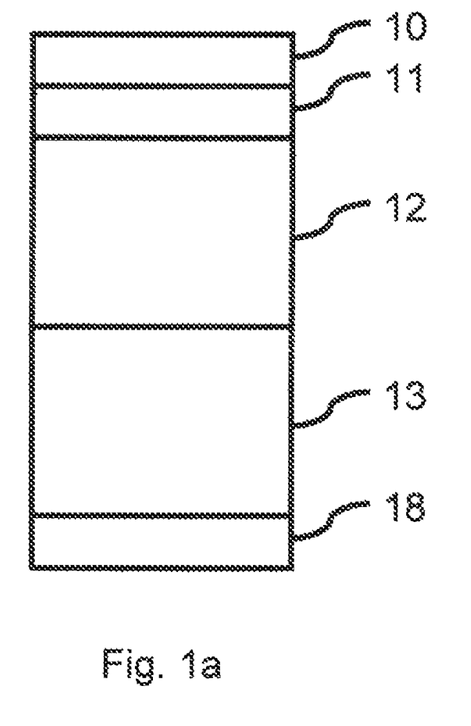
Figure 1B:
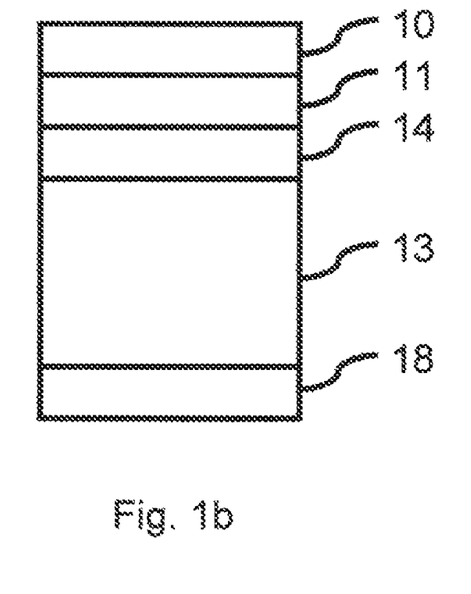

Embodiments of this invention comprise battery components from which excess active materials have been eliminated by using thin conformally bonded electrodes or electrode/separator components. FIG. 1 illustrates some embodiments of this invention. In each section of FIG. 1, one cell of a battery that may comprise multiple cells stacked in a bipolar configuration is illustrated. In some embodiments of this invention, multiple cells may be arranged in series to increase the voltage or in parallel to increase the current for a particular application. FIG. 1a illustrates a battery embodiment wherein one electrode comprises the silicate binder of this invention. A current collector 10 is in electrical contact with a cathode layer 11. The cathode layer 11 comprises an electrode material intermixed with a silicate binder material. In the embodiment illustrated in FIG. 1a, the separator 12 and the anode layer 13 are prepared by conventional methods. For example, in thermal battery embodiments, the separator 12 and anode layer 13 could be prepared using a conventional pressed-pellet technique. FIG. 1b illustrates a battery embodiment wherein the cathode 11 comprises a layer of an electrode material intermixed with a silicate binder. The separator layer 14 comprises a separator material and a silicate binder. The anode layer 13 is prepared by conventional methods. For example, in thermal battery embodiments, the anode layer 13 could be prepared using a conventional pressed-pellet technique. In each case, the layer stack is terminated with a second current collector 18. In embodiments where multiple cells are stacked in a bipolar arrangement in a series configuration, the first 10 and second 18 collectors will be at opposing ends of the cell stack.

Figure 2:
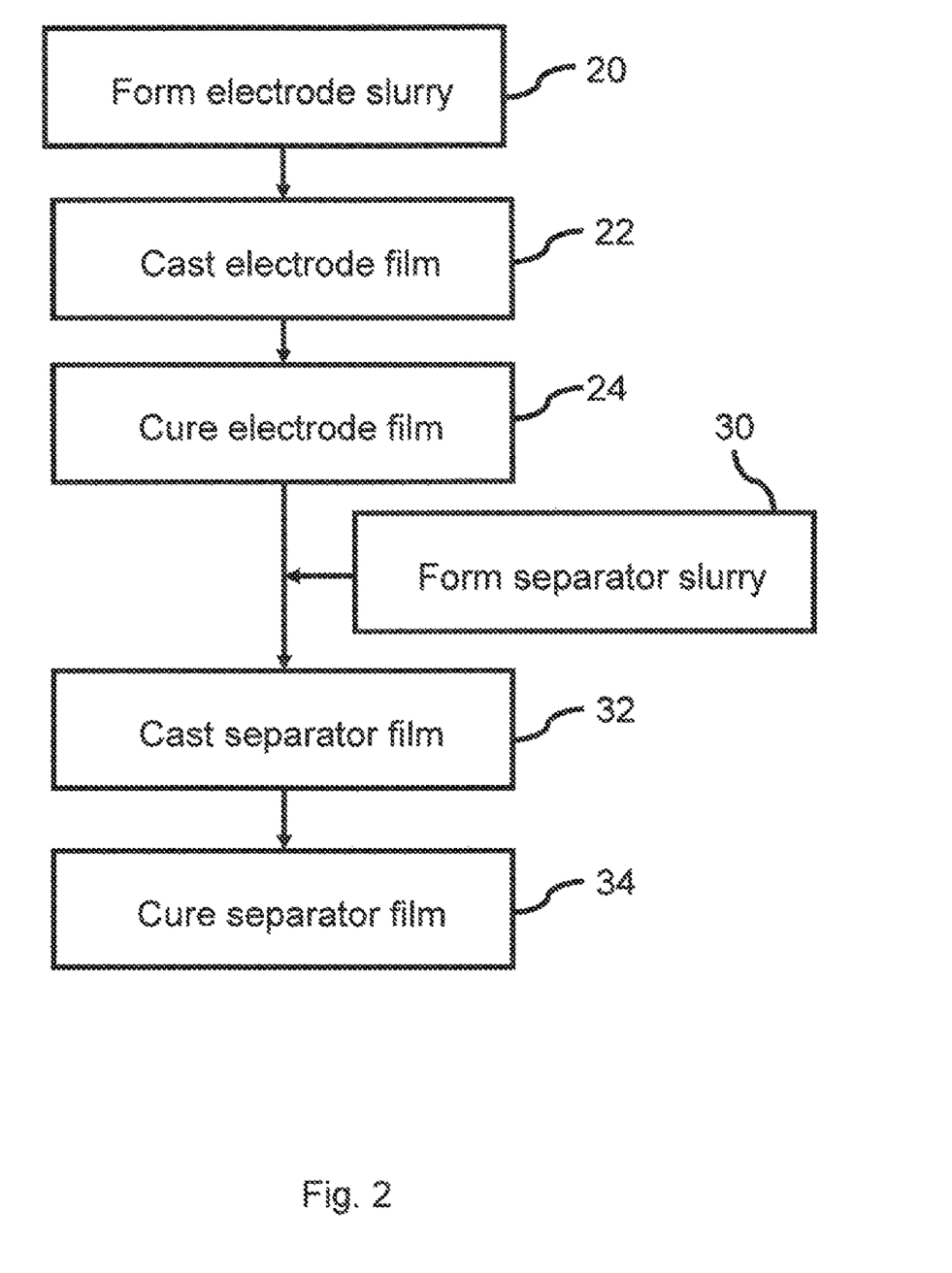
FIG. 2 illustrates an embodiment of the method of forming a coated battery component.

The silicate binders employed in embodiments of this invention enable the use of coating, casting and printing technology to fabricate thin conformally bonded electrodes and electrode/separator components. In various embodiments, these silicates are effective in bonding sulfides, oxides, carbides, nitrides, carbon and particulate organic materials. Silicates serve as a binder to enable the use of a slurry to apply cathode, and separator materials by coating, casting or printing. Multilayer coating, casting, or printing can be employed in embodiments of this invention to produce coatings of two or more layers of differing composition. For example, in some embodiments (FIG. 2), one first forms a silicate-containing slurry of an electrode material 20, coats the electrode material/silicate slurry onto a current collector 22, and cures the electrode film 24. Using a prepared silicate-containing separator-material slurry 30, one coats a separator layer 32 onto the electrode/collector component, and cures the separator layer 34. Embodiments of this invention allow the formation and use of components of variable size and shape, and the components can be thinner than components formed by conventional techniques, such as pellet compression.

The glassy silicate binders are derived from a class of water-soluble silicates in which the tetrahedral silicate anion ($SiO_4^{-4}$) is associated with $H^+$, $Na^+$, $K^+$ or $Li^+$ cations and the silicate moiety can be tetrahedrally coordinated with other silicate moieties to form complex silicate anions having polymeric structures. Among many possible structures that may form upon coordination are linear trimers, cyclic trimers, cyclic tetramers, prismatic hexamers, and cubic octamers. The term silicate is used to include the many possible structures ranging from monomers to polymers that can form in solution, unless otherwise indicated. The compositional distribution of these anion structures in solution is termed speciation, and the speciation is strongly influenced by the concentration of solids and by the ratio of silica ($SiO_2$) to alkali (e.g. $Na_2O$). For example, a typical commercial grade of sodium silicate is sold with a ratio of $SiO_2$ to $Na_2O$ of R=3.22. When the solvent water is removed from a silicate solution by evaporation, and then further dehydration is performed at elevated temperatures (c.a. 250° C.), the properties of the glassy silicate residue depend to a large part on the silica to alkali ratio. Under the conditions described below for some embodiments, the silicate residue can serve as a binder in thermal battery components. Solutions with a high ratio of silica to alkali oxide contain complex polymeric structures. Such solutions yield excellent binders when dehydrated. Solutions with lower ratios of silica to alkali oxide contain large ring structures. These solutions yield weaker (less effective) binders. However, binding effectiveness is not the sole consideration for selecting an appropriate solution composition for a particular application. For example, for thermal battery applications, the coefficients of thermal expansion are important, and it may be more important for a particular application to select a material with suitable thermal expansion properties than to select a material that forms a stronger binder.

In some embodiments, slurries containing inorganic aqueous polymers of sodium silicate, potassium silicate, or lithium silicate or mixtures of these silicates are condensed onto the surfaces being coated to yield glassy film-forming binders as they are dehydrated. Such binders can be thermally stable to temperatures greater than 600° C. Specific properties of the binders can be adjusted by adjusting the silicate anion structure (speciation) in the aqueous solution prior to dehydration, and by adjusting the ratios of Na to K to Li in the dehydrated glass.

In some embodiments (including those which utilize cathode materials other than $FeS_2$), the current collector can be made of stainless steel or other suitable metal that does not react in a deleterious way with the electrode material, such as, for example, Al, Cu, Ni, Fe, Ti, Mo, and their alloys. The thermal coefficient of expansion of the coating is selected to approximately match that of the current collector. In embodiments where 304 stainless steel is used as a current collector for a $FeS_2$ cathode, a mixture of sodium silicate and lithium silicate will yield a glassy binder with a thermal coefficient of expansion closer to that of the stainless steel than the pure sodium silicate or pure lithium silicate derived binders.

Cohesion is achieved by the gelation/polymerization and precipitation of the polymeric silicate as the aqueous solvent evaporates. Evaporation may be facilitated by heating or by reducing atmospheric pressure. Once the solvent has evaporated, the electrode is heated to dehydrate the silicate and complete the glass formation; for some embodiments, a temperature of approximately 250° C. is employed.

Adhesive strength between a cathode and a separator can be improved by dehydrating the silicate binders at a relatively slow rate. To reduce or prevent redissolution of the silicate in the cathode during over-coating to form the separator portion of a separator/cathode collector component, it is desirable to remove most if not all of the hydrated water from the cathode coating before applying the separator slurry to the cathode/collector component. In over-coating the separator onto the completely dehydrated cathode, some of the separator slurry solvent (containing soluble silicate binder) can penetrate into the cathode layer. When this occurs, there can be a change in the silicate composition of both the cathode and the separator compared to the starting slurry compositions. This may affect the electrochemical performance of the cathode and should be considered in selecting initial slurry compositions.

Figure 3:
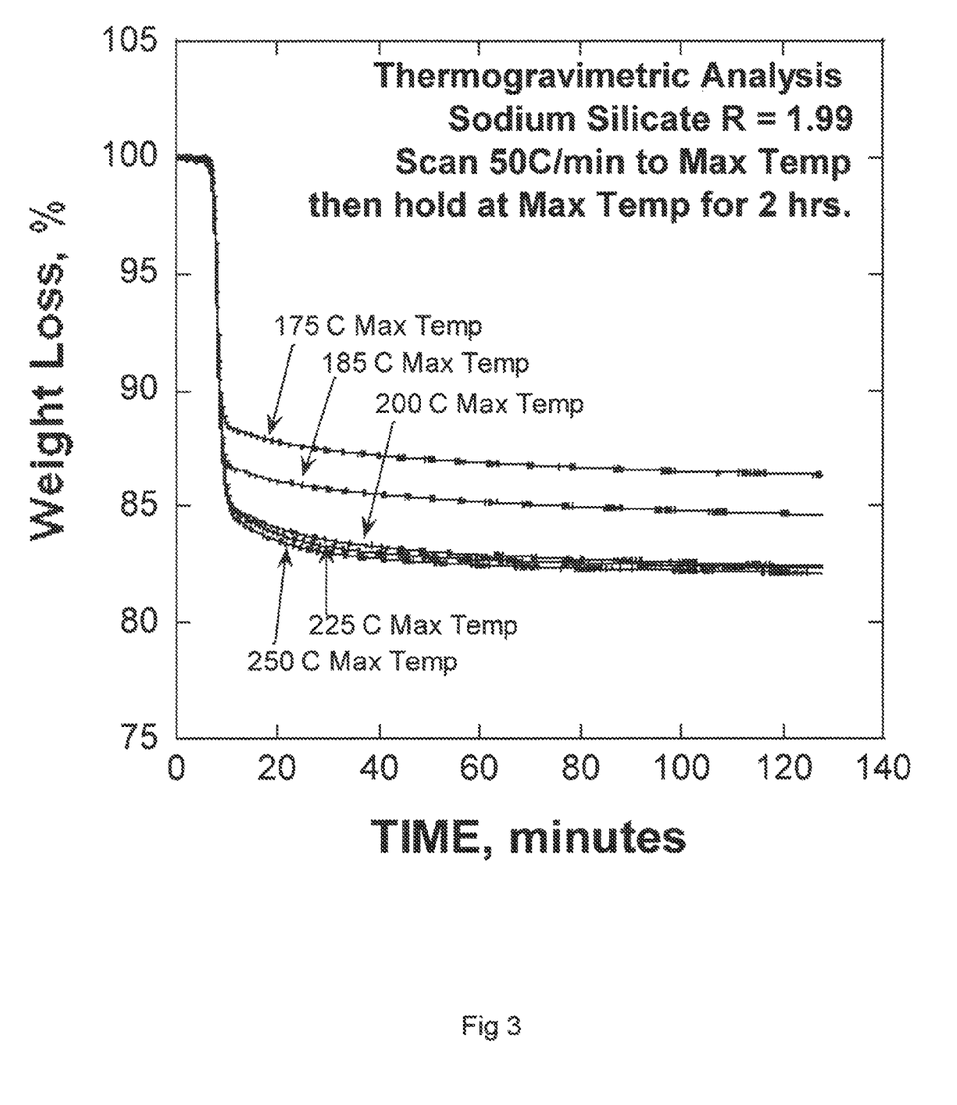
FIG. 3 illustrates the weight loss during curing of the sodium silicate binder.

One technique for establishing a heating protocol for removal of water is gravimetric measurement of water loss during heating. In one embodiment, air-dried, coated structures were heated at approximately 110° C. for approximately 30 min to remove surface water prior to the gravimetric measurement. The coated structures were then thermally ramped at a rate of approximately 50° C./min to a desired temperature and then held at approximately that temperature as water loss is measured gravimetrically. For the silicate employed in one embodiment, heating at temperatures in excess of 225° C. was required for substantially complete dehydration during a 30 minute heating time. Consequently, heating at 250° C. for 30 minutes was commonly used for the embodiments described herein. Alternative temperatures and times may be used as long as sufficient dehydration is obtained. Different silicate slurry formulations and different coating thicknesses may perform better with different thermal curing conditions; suitable conditions may be readily determined by one skilled in the art. Typical thermogravametric behavior for a sodium silicate of a $SiO_2$:$Na_2O$ ratio R=1.99 is illustrated in FIG. 3.

If the cathode material is thermally stable in air at the highest curing temperature, then dehydration can be performed in air. If the cathode material is thermally degraded due to reaction with oxygen, thermal curing can be performed in an inert atmosphere or under vacuum. To achieve uniform adhesion without bubble formation or delamination, it is desirable to allow initial drying of the wet, slurry-coated surface at temperatures below 80° C. before heating to the final curing temperature.

In some embodiments of this invention, a cathode is fabricated by coating onto a current collector an aqueous slurry comprising an electroactive material (typically a metal sulfide), and soluble silicate. We define the term sulfide to include sulfides, disulfides, and polysulfides. In another embodiment of the method of this invention a separator is fabricated by coating an aqueous slurry comprising an inert electronic insulator, such as, for example, MgO, CaO, $SiO_2$, $Al_2O_3$, $ZrO_2$, $HfO_2$, $Ce_2O_3$, $Y_2O_3$, $ThO_2$, BN, or mixtures thereof, and soluble silicate onto an anode, such as, for example, magnesium. In another embodiment, the separator may be coated onto the cathode component. Performance is improved if the cathode is thermally processed and dehydrated before over-coating the separator onto the cathode.

Thixotropic agents, dispersants, secondary film formers, plasticizers, surfactants, defoaming agents, inert pore-formers and electronic conductive additives (for the cathode) may also be incorporated in the slurry. Thixotropic agents include modified organoclays. Dispersants include treated fumed silicas. Secondary film formers (which also improve dispersion) include starch, dextrin and glycerine. Plasticizers include sugars, glycerine, sorbitol and polyhydric alcohols. Surfactants include silicate-compatible anionic or non-ionic surfactants; these can be used with a combined isopropyl alcohol/water solvent, or alcohol alone may be use to lower the surface tension of the slurry. A variety of defoaming agents, as known in the defoaming art, can be used. Inert pore-formers include: starch, polyvinyl alcohol, methyl cellulose, hydroxypropyl methylcellulose, and carboxymethyl cellulose. Conductive additives include: carbon, carbon black, and graphite.

If employed in an embodiment, the thixotropic agents, dispersants, secondary film formers, plasticizers, surfactants, defoaming agents, and pore formers can be removed from the dehydrated cathode and/or separator by thermal oxidation, thermal decomposition, volatilization, extraction, or dissolution prior to cell activation. If they are not removed in a particular embodiment, additives are selected that will not adversely interfere with the discharge characteristics of the cell when activated.

To achieve good adhesion of the silicate binder to the metal surface of the current collector, some surface preconditioning may be helpful in some embodiments. Establishment of a surface with high surface tension facilitates binding. Plasma cleaning, cleaning with a basic solution, such as, for example, concentrated $NH_4OH$, and flame treating improve adhesion and enables uniform coating.

Figure 4:
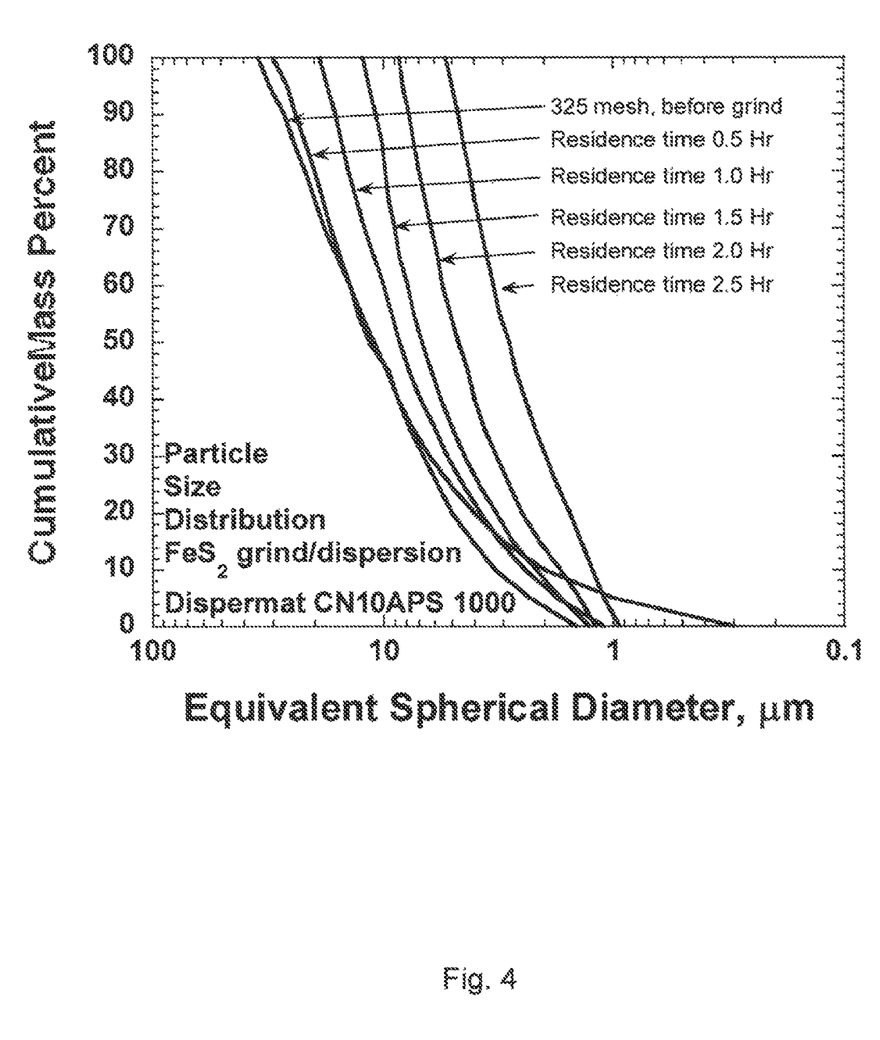
FIG. 4 illustrates the $FeS_2$ particle size distribution as a function of bead milling time.

In one embodiment of this invention, a cathode/current collector component was made for a thermal battery. In this embodiment, the cathode material was $FeS_2$, which is a common cathode material for conventional thermal batteries. Particles of $FeS_2$ of a size suitable for forming a slurry were prepared. A particle diameter of less than approximately 10 micrometers was employed. One method for preparing such material was to process 325 mesh $FeS_2$ and water in a high-speed bead mill using 48 vol % zirconia beads at 2500 rpm. Particle size distribution depends on the residence time in the bead mill. FIG. 4 illustrates the size distribution of particles as a function of bead-mill residence time. In this embodiment, a suitable particle size distribution was achieved after between 2 and 2.5 hours. Other techniques for forming a stable slurry can also be used in embodiments of this invention. The resulting $FeS_2$ dispersion exhibited stable pseudo-plastic rheology suitable for coating.

Figure 5:
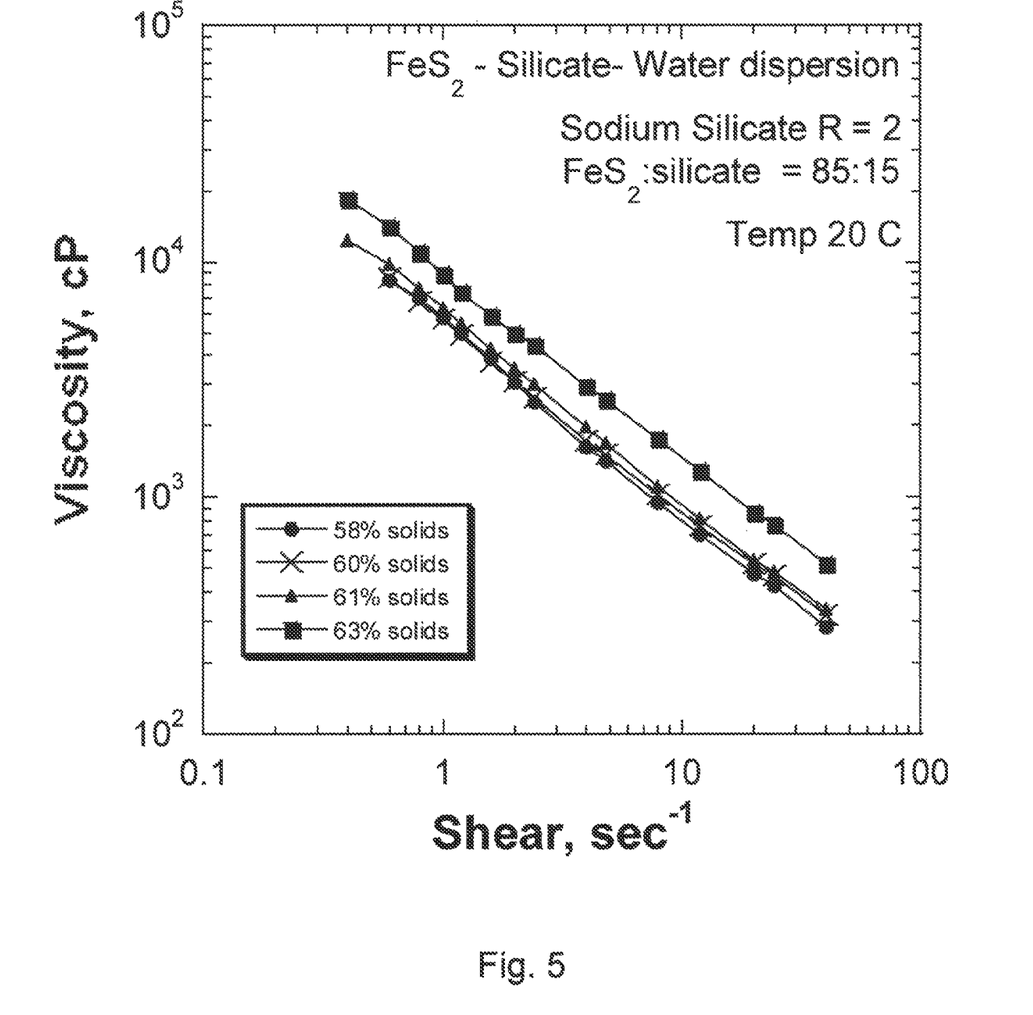
FIG. 5 illustrates the rheology of the FeS2-silicate-water dispersion as a function of the percentage of solids in the slurry.

The aqueous $FeS_2$ dispersion had a pH of 5.5. At this pH, the silicate binder solution is unstable and will begin to crosslink so that the dispersion will begin to agglomerate. This gelation/polymerization reaction begins to occur when the pH falls below approximately 10.7. Therefore, before the silicate binder was added to the $FeS_2$ suspension, the pH of the dispersion was adjusted to pH approximately 11 using a 50% $NH_4OH$ solution. The neutralization of the acidic surface of the $FeS_2$ was a slow reaction and the pH was sequentially adjusted over a period of about 16 hours. Alternatively, once the appropriate amount of $NH_4OH$ has been established for a particular concentration of $FeS_2$, and particular particle size distribution of $FeS_2$, the appropriate amount of $NH_4OH$ may be added during the bead mill processing of the dispersion and the resulting $FeS_2$ dispersion may be allowed to sit to allow neutralization before silicate addition. For example, in some embodiments, the dispersion may be allowed to sit for overnight before adding the silicate binder. Variations in the time of addition of the pH-adjusting base and in the time during which the $FeS_2$ pH-adjusted slurry is allowed to equilibrate are permissible as long as the addition of the silicate is performed after the equilibration has established suitable pH conditions. While the embodiments described in detail herein employed $NH_4OH$ for pH adjustment, other bases, such as, for example, NaOH, KOH or LiOH may be used. For one embodiment, after sitting overnight, the hydrated silicate binder was added to the $FeS_2$ dispersion and heated to 60° C. for approximately 1 to 2 hours to facilitated dissolution of the silicate. The rheology was adjusted with water, and the resulting slurry was used to coat the cathode material onto the stainless steel current collector using a drawdown bar as described in: Joseph V. Koleske, Ed., "Paint and Coating Testing Manual, Fourteenth Edition of the Gardner-Sward Handbook", ASTM Manual Series: MNL 17, ASTM Publication Code Number (PCN) 28-017095-14, ASTM, 1916 Race Street, Philadelphia, Pa. 19103, pp418-420, (1995). FIG. 5 shows the pseudo-plastic rheology of the $FeS_2$-silicate-water dispersion for a $FeS_2$:silicate ratio of 85:15 by weight and total solids of 58, 60, 61, and 63% by weight. For this example the silicate consisted of $SiO_2/Na_2O$ R=2.0.

The $FeS_2$:silicate ratio and the total weight percent solids in the cathode slurry can vary considerably depending on the required adhesive strength, the match in the thermal coefficient of expansion of the coating with the current collector, and the method of application of the cathode (drawdown bar, spray coating, printing etc.). For example, when the thermal coefficient of expansion of the cathode coating must closely match the thermal coefficient of expansion of a 304 stainless steel current collector, then a silicate binder that is a mixture of 66% by weight $SiO_2/Na_2O$ R=2.0 and 34% by weight $SiO_2/Li_2O$ R=8.2 such that the total $FeS_2$:silicate ratio is 90:10 and the total solids in the cathode slurry is 74% by weight can be used for good performance. The desirable $FeS_2$:silicate ratio varies in the range of approximately 95:5 to approximately 85:15 and the desirable weight percent solids in the cathode slurry varies from approximately 60 to approximately 80%. The coated cathode was air dried at room temperature for approximately 4 hours, then sequentially heated in air at: 125° C. for 30 minutes, 190° C. for 30 minutes, and 250° C. for 30 minutes.

The performance of a cathode/current collector component fabricated by the method of this example embodiment was measured in combination with a conventional thermal battery MgO separator pellet and a conventional thermal battery Li(Si) anode pellet. Upon activation at 500° C., the coated cathode was infused with molten electrolyte from the pellet separator, and the cell was then discharged at 100 mA/cm². The electrolyte employed in this demonstration embodiment comprised the eutectic mixture of. LiCl and KCl (45% LiCl and 55% KCl by weight).

Figure 6:
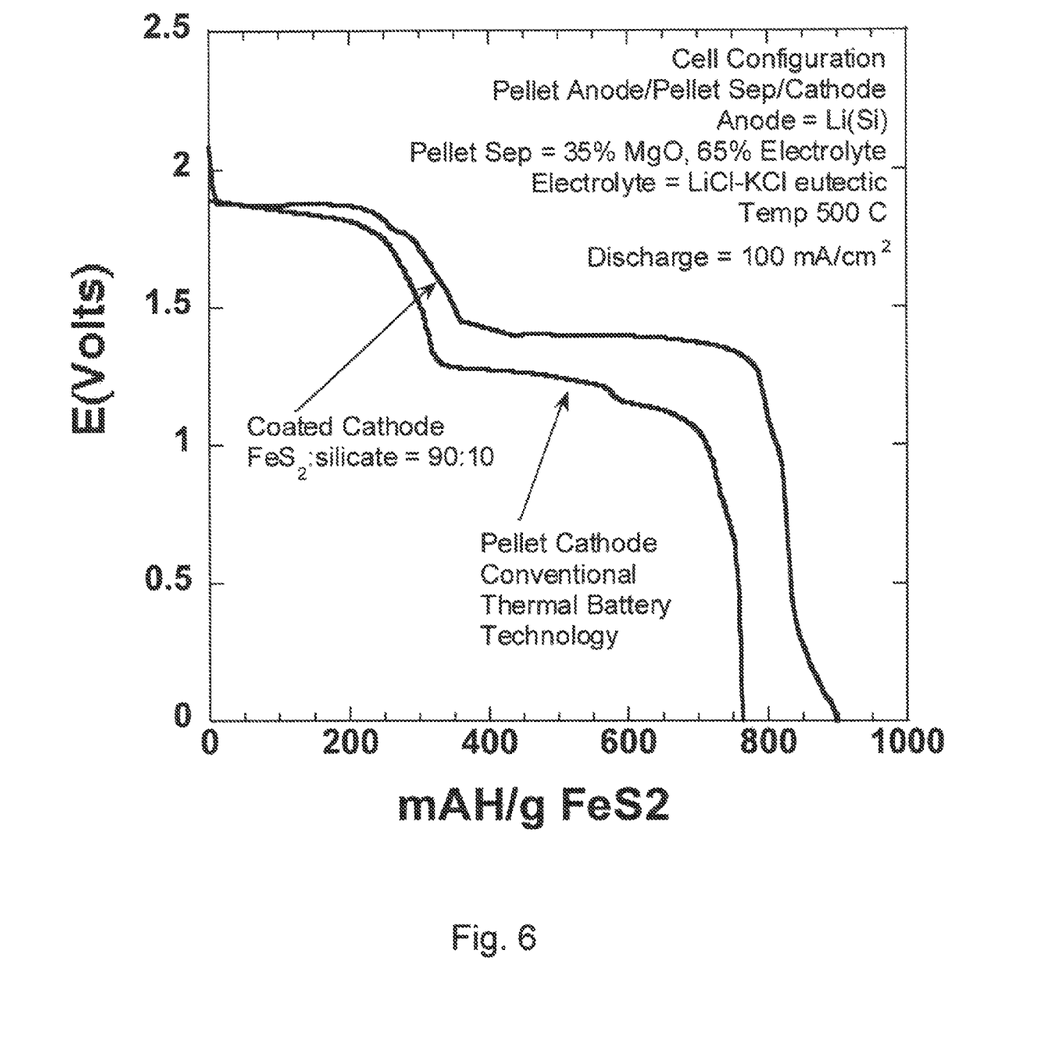
FIG. 6 illustrates the discharge of a thermal battery comprising a coated cathode comparison to a thermal battery comprising a pellet cathode.

In FIG. 6, the performance of a conventional pellet-based thermal battery single cell with pellet cathode/pellet separator/pellet anode structure is compared with the performance of a thermal battery single cell with a coated cathode/pellet separator/pellet anode structure. This embodiment compares the performance of a conventional pellet $FeS_2$ thermal battery cathode and a silicate-binder $FeS_2$ cathode of the present invention. The results show that the silicate binder cathode/current collector yields the same or better performance than the pellet cathode in the conventional structure. However, the coated cathode can be made much thinner than the pellet components of the same area (in this specific example the coated cathode is ⅓ the thickness of the pellet cathode, providing significant advantage over the conventional structure.

In another embodiment, a cathode was coated onto a stainless-steel current collector and thermally processed according to the procedure described above in which the binder was a mixture of 66% $SiO_2/Na_2O$ R=2 and 34% $SiO_2/Li_2O$ R=8.2. The ratio of $FeS_2$:silicate was 90:10. In this example, the cathode slurry also contained 0.7% by weight carboxymethyl cellulose. A separator slurry was formulated by blending for 10 minutes using a shaker-mixer, 30 g of $Al_2O_3$ with 5.8 g of a solution containing 39.1% $SiO_2/K_2O$ R=2.1. Zirconia beads were used to aid in the dispersion of the $Al_2O_3$. The rheology of the dispersion was adjusted with water and the resulting slurry was coated using a drawdown bar over the $FeS_2$ cathode and cured to yield a conformally bonded $Al_2O_3/FeS_2$/stainless-steel structure as a separator/cathode/current collector component. The separator/cathode/current collector component was thermally processed as described for the cathode/current collector component above.

Figure 7:
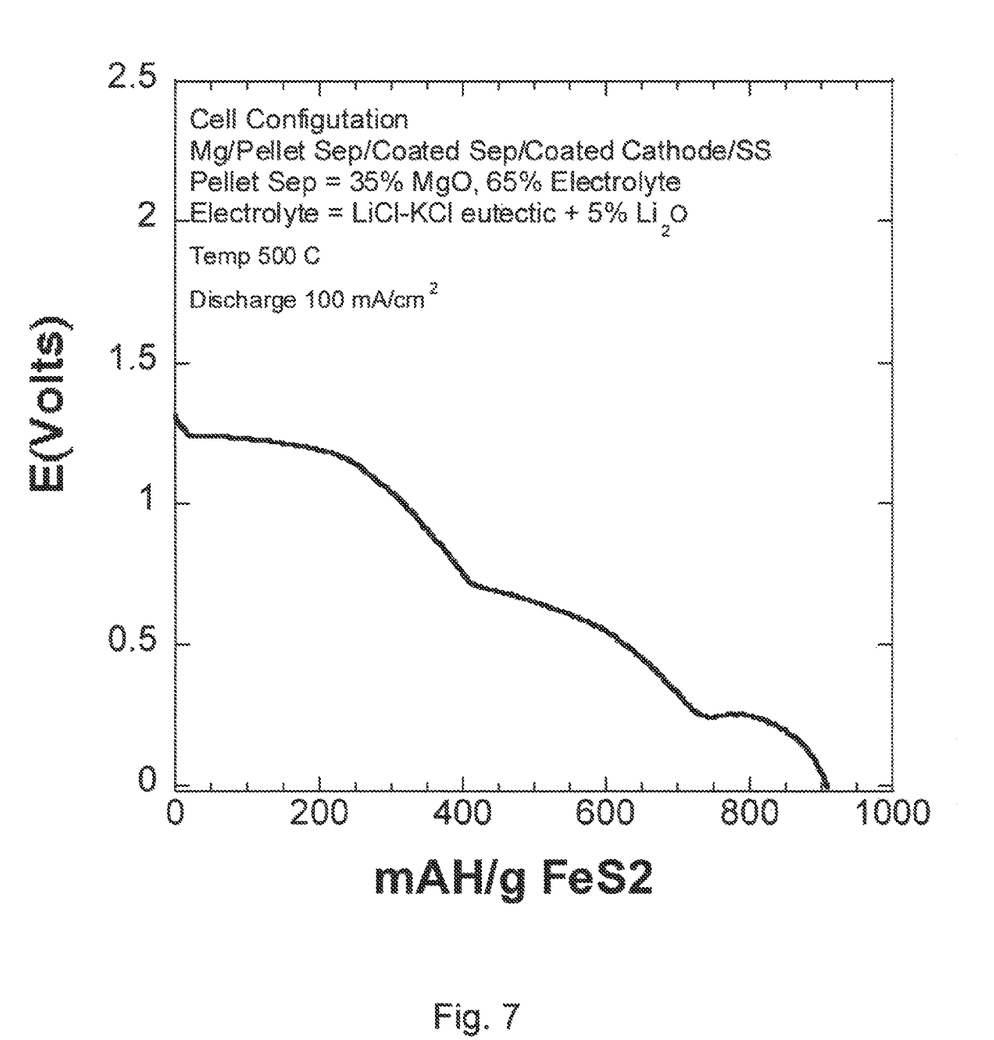
FIG. 7 illustrates the discharge of a thermal battery comprising a coated separator/coated cathode component.

The performance of the separator/cathode/current collector component fabricated by the method of this example was measured in combination with a conventional thermal battery MgO separator pellet and a magnesium foil anode. Upon activation at 500° C., the coated separator/cathode was infused with molten electrolyte from the pellet separator, and the cell was then discharged at 100 $mA/cm^2$. The electrolyte employed in this test embodiment comprised the eutectic mixture of LiCl and KCl (45% LiCl and 55% KCl by weight). The discharge of the Mg/Pellet Sep/Coated Sep/Coated $FeS_2$/stainless steel single cell is shown in FIG. 7. The performance of this embodiment illustrated in FIG. 7 shows that the coated separator/coated cathode component performs as well as a pellet separator/pellet cathode. However, the coated separator/coated cathode component is much thinner than the total of the pellet separator+pellet cathode; in this embodiment the coated separator is approximately half the thickness of the separator pellet.

A variety of methods can be used to apply the cathode or separator slurry to their corresponding substrates in various embodiments. Some methods of application include but are not restricted to web casting, spin casting, brush coating, drawdown bar coating, spray coating, screen printing, flexographic printing, and gravure printing. The thickness of the coating can vary from approximately 0.5 mil to approximately 15 mil and is controlled primarily by the method of application. The silicates employed in various embodiments of this invention utilize an aqueous solvent. The solvent can be removed in a variety of ways including, but not restricted to, evaporation at room temperature, thermally assisted evaporation, reduced-atmosphere-assisted evaporation, vacuum assisted evaporation, and freeze drying.

The embodiments of this invention as described above have been used as thermal battery components. However, the silicate binders may be used to formulate cathodes and separators of other nonaqueous battery systems or electrochemical capacitor systems that utilize organic electrolytes, nonaqueous inorganic electrolytes, or ionic liquid electrolytes. The silicate binders may also be used to formulate fuel cell electrodes and separators so long as the aqueous electrolytes remain acidic or neutral pH.

The principle limitation for application of embodiments of this invention is the need for sufficient chemical stability in water to permit use of basic aqueous solvents in forming the slurry. Therefore, electrode materials with sufficient chemical stability in water can also be used in embodiments of this invention.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A battery component structure comprising:
   a first current collector;
   an electrode layer comprising an electrode material intermixed with a glassy silicate binder material, the electrode layer being in electrical contact with the first current collector, wherein the glassy silicate binder material serves as a binder to bind the electrode material; and
   a separator layer comprising an electrode separator material intermixed with a silicate binder material, the separator layer being in contact with a surface of the electrode layer that is not a surface of the electrode layer that is in electrical contact with the first current collector.

2. The battery component structure of claim 1, wherein the electrode separator material comprises an electronic insulator.

3. The battery component structure of claim 1, wherein the electrode separator material is selected from the group consisting of MgO, CaO, $SiO_2$, $Al_2O_3$, $ZrO_2$, $HfO_2$, $Ce_2O_3$, $Y_2O_3$, $ThO_2$, BN, and combinations thereof.

4. The battery component structure of claim 1, wherein the electrode material is a cathode material selected from the group consisting of metal sulfides, metal oxides, metal phosphates, metal oxyphosphates, calcium chromate, lead chromate, potassium chromate, potassium dichromate, poly-carbon monofluoride, carbon, carbon black, and graphite.

5. The battery component structure of claim 1, wherein the electrode material is $FeS_2$.

6. The battery component structure of claim 1, wherein the silicate binder material is a glassy silicate comprising at least one silica associated with at least one of a sodium oxide, a potassium oxide, and a lithium oxide.

7. A battery component structure comprising:
   a first current collector; and
   an electrode layer comprising an electrode material intermixed with a glassy silicate binder material, the electrode layer being in electrical contact with the first current collector, wherein the glassy silicate binder material serves as a binder to bind the electrode material, wherein the electrode material is $FeS_2$.

* * * * *